United States Patent [19]

Hood

[11] Patent Number: 5,029,957
[45] Date of Patent: Jul. 9, 1991

[54] LIGHT GUIDE COUPLING APPARATUS

[75] Inventor: Randy Hood, Milton, Canada

[73] Assignee: EFOS Inc, Mississauga, Canada

[21] Appl. No.: 466,856

[22] Filed: Jan. 18, 1990

[51] Int. Cl.$^5$ ................................................ G02B 6/36
[52] U.S. Cl. .................................. 350/96.2; 350/96.1
[58] Field of Search ................... 350/96.2, 96.1, 96.26, 350/96.18, 96.3

[56]  References Cited
U.S. PATENT DOCUMENTS 4,377,086 3/1983 Linder et al. .................... 350/96.1 X
4,408,827 10/1983 Guthrie et al. ...................... 350/96.1
4,695,697 9/1987 Kosa ............................ 350/96.26 X
4,711,524 12/1987 Morey et al. ................. 350/96.26 X Primary Examiner—John D. Lee
Assistant Examiner—John Ngo
Attorney, Agent, or Firm—David W. Wong

[57]  ABSTRACT

This coupling device is for coupling a light guide such as a light wand to a light source for photocuring purposes. It enhances the curing ability of the photocuring system at lower wavelength of light while at the same time provides thermal isolation between the lamp housing and the light wand.

6 Claims, 2 Drawing Sheets

LIGHT GUIDE COUPLING APPARATUS

BACKGROUND OF THE INVENTION

This invention relates to an optical curing system and more particularly relates to a light guide coupling apparatus suitable for coupling a light guide to a light source for optical curing purposes.

Some resins commonly referred to as UV resins will transform from a tacky substance to a tack-free form upon being subjected to optical curing by ultra violet light in the range of from 200 nanometer (nm) to 400 nm. Such curing technique is particularly advantageous in the formation of resinous base adhesive on a substrate or medium. The adhesive coating thus formed on the substrate is extremely strong and has a high strength bonding to the substrate. The curing process can be completed in a very short time of less than a minute, in comparison with a day or more with the use of other conventional curing methods such as heat curing. Moreover, since no heat is involved in the optical curing process, no heat damages will occurred to the substrate or other delicate components which may be located in the immediate area on the substrate at which the resin is to be cured in situ or on-the-spot. For the above reasons, optical curing of UV resins used as adhesive lends it particularly useful in the fabrication process of making such as fibre optic joints, electro-optics, lens assembly, printed circuit board applications, wire tacking, encapsulating or potting, and high strength bonding of disparate materials.

In order to carry out the optical curing process on-the-spot or in situ in a work piece, the ultra violet light generated by a light source must be directed by a light guide commonly referred to as a light wand and normally made of a fluid light guide such as an elongated optical fibre, to illuminate at the spot or area in the work piece having the UV resin provided thereon. However, due to the inherent infra red radiation present in the ultra violet radiation, which invariably creates harmful heat in the light guide, as well as the close proximity of the light guide to the hot housing of the ultra violet lamp, the high temperature can cause damage to the light guide. In some known optical curing devices thermal protection for the light guide are provided by incorporating heat absorbing filters located between the light guide and the lamp. However, the filtering lens also invariably attenuates the desirable useful light radiation. The attenuation of the light radiation by the filtering lens grows quickly to unacceptable high values at wavelengths below 340 nm which are essential in the optical curing of adhesive.

SUMMARY OF THE INVENTION

The principal object of the present invention is to provide a light guide coupling apparatus which has a negligible attenuation to light radiation passing therethrough.

It is another object of the present invention to provide a light guide coupling apparatus which isolates the heat in the light source from the light guide.

It is a further object of the present invention to provide a light guide coupling apparatus which eliminates optical losses between the light source and the light guide.

It is still a further object of the present invention to provide a light guide coupling apparatus which is simple in structure and is easy to be incorporated between the light guide and a light source.

Generally the light guide coupling apparatus for coupling a flexible light guide to a light source, comprises a substantially rectangular enclosure means having two mutually parallel side walls; an elongated tubular means is mounted to one of the two side walls. The tubular means has one end portion extending within the enclosure means, and a second end portion therein extending outside of the enclosure means. A chuck means is mounted on the other side wall and is located directly opposite to and spaced from the one end portion of the tubular means within the enclosure means. The chuck means has an adaptor opening formed therein and is operative to receive a mounting end portion of the flexible light guide to be inserted therethrough to abut the one end portion of the tubular means located within the enclosure means. An elongated fused silica rod means is housed within the tubular means. The silica rod means has a rounded end pointing towards the chuck means and a truncated flat end located adjacent to a free end of the tubular means. The tubular means is operative for mounting to a light source housing so that the light radiation from the light source passes through the fused silica rod means to the flexible light guide.

DETAIL DESCRIPTION OF THE PREFERRED EMBODIMENTS

Figure 1:
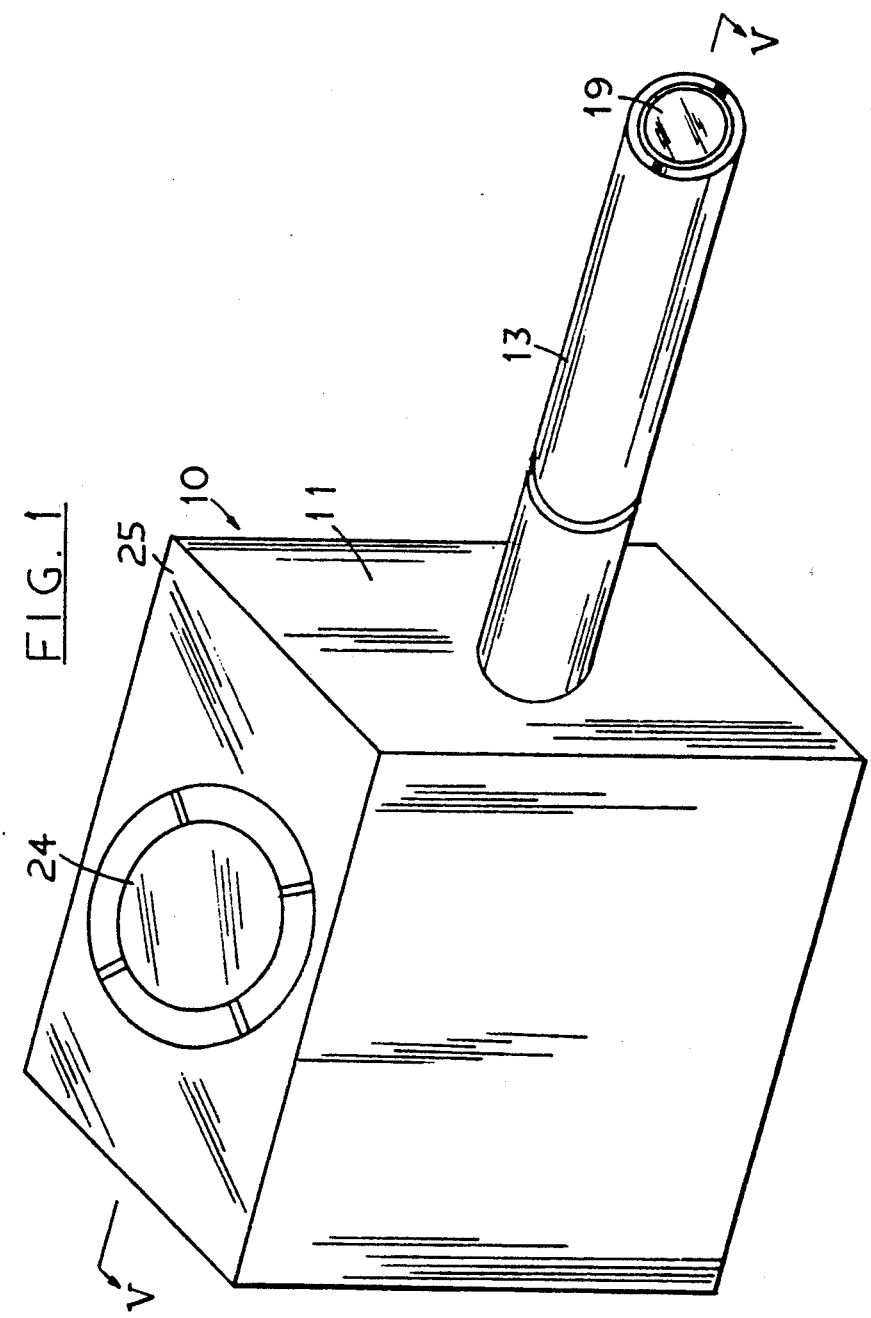
FIG. 1 is a perspective elevation view of the light guide coupling apparatus according to the present invention.
Figure 3:
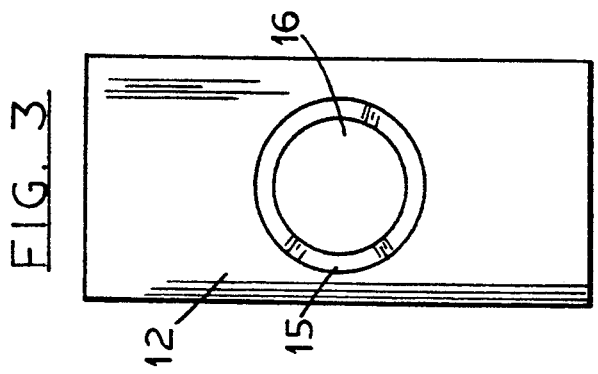
FIG. 3 is the left elevation view thereof.
Figure 2:
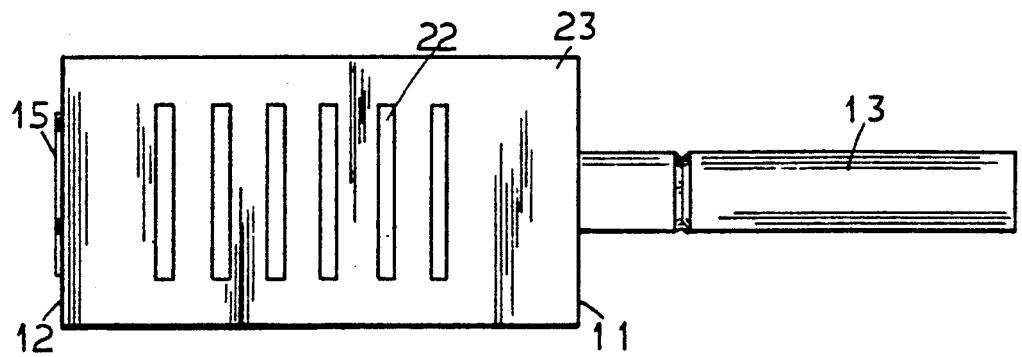
FIG. 2 is the bottom elevation view thereof.
Figure 5:
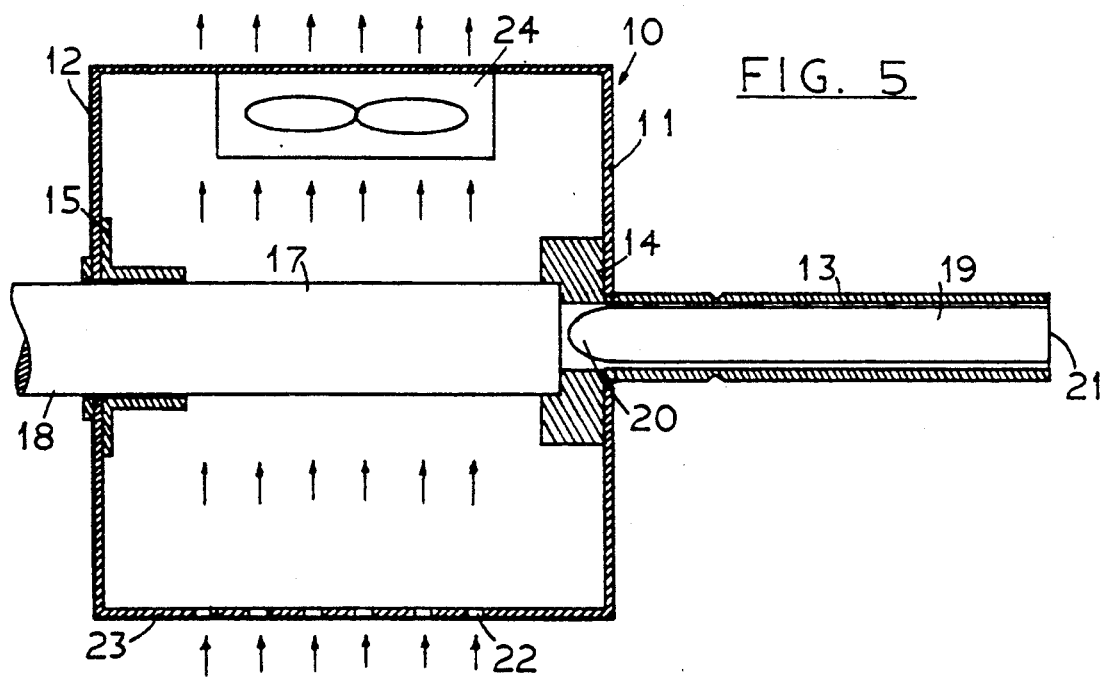
FIG. 5 is a section elevation side view of the light guide apparatus along line V—V in FIG. 1.
Figure 4:
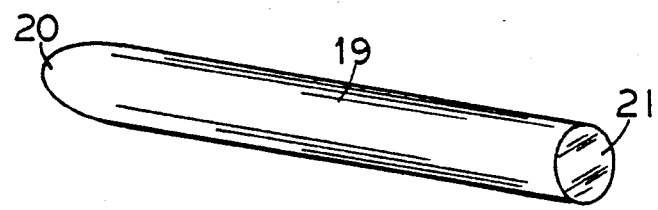
FIG. 4 is a perspective elevation view of the fused silica rod means in the light guide coupling apparatus according to the present invention.

With reference to the drawings wherein like reference numerals designate corresponding parts in the several views, the housing 10 of the light guide coupling apparatus according to the present invention is substantially rectangular in shape and having two mutually opposite and parallel side walls 11 and 12. A cylindrical tube 13 is mounted in a perpendicular manner at the centre of side wall 11. The tube 13 is preferably made of a low heat efficient and opaque material such as an opaque plastic material and it has an end portion 14 located within the housing 10, and the remaining portion of the tube 13 extend outside of the housing 10 in a canti-level manner, which is operative for mounting to a light source housing for admitting light radiation through the tube 13 into the housing 10. An adaptor chuck 15 is mounted on the side wall 12 and is located directly opposite to the end portion 14 of the tube 13. The adaptor chuck 15 has an opening 16 operative to receive the mounting end 17 of a flexible light guide 18 to be inserted therethrough, such that the light receiving end of the flexible light guide 18 abuts intimately with the end portion 14 of the tube 13 to receive the light entering through the tube 13.

An elongated cylindrical silica rod 19 such as a fused silica rod or natural quartz rod is located within the tube 13. Such fused silica rod has a light transmission value of about 90 percent range for light radiation down to the wavelength of 200 nm. The silica rod 19 is of the same length as the tube 13 so that it serves as a light guide for transmitting the light radiation through the tube 13 into the housing 10. The fused silica rod 19 has a rounded end 20 abutting the end of the tube 13 located within the housing 10, and a truncated flat end 21 located adjacent to the free end of the tube 13, such that the silica rod 19 has the form of an elongated magnifying lens for amplifying the light radiation passing therethrough from the truncated flat end 21 to the rounded end 20. Thus, it inherently compensates for any transmission loss of the light passing therethrough to the flexible light guide 18. Furthermore, the silica rod 19 also serves as a thermal isolation means between the flexible light guide 18 and the high temperature light source mounted to the tube 13.

Ventilation slots 22 are formed at the bottom Panel 23 of the housing 10 so as to provide cooling of the mounting end 19 of the light guide 18 located within the housing 10. Additionally, a blower fan 24 is provided at the top panel 25 of the housing 10 to enhance the cooling fresh air to flow therethrough.

While the invention has been particularly shown and described with reference to a preferred embodiment thereof, it will be understood by those skilled in the art that various changes in form and detail may be made therein without departing from the spirit and scope of the invention.

What is claimed is:

1. A light guide coupling apparatus for coupling a light guide an ultra violet light source for optical curing operation, comprising
a housing means having a first side wall, and a second side wall positioned substantially opposite to said first side wall, an elongated tubular means mounted to said first side wall and having a free end therein extending outside of said housing means, said tubular means being operative for coupling to said ultra violet light source,
a chuck means mounted on said second side wall and being operative to receive an end portion of said light guide to be inserted therethrough into said housing means,
an elongated cylindrical silica rod means disposed in said tubular means, said silica rod means having a truncated flat end and a rounded end, said flat end being disposed at said free end of said tubular means and operative to receive said ultra violet light from said light source, and said rounded end being disposed in abutment with said light guide, said silica rod means being operative to focus said ultra violet light from said light source onto said light guide for transmission said ultra violet light to a remote location for optical curing application, an air cooling means located in said housing and operative to circulate ventilating air around said light guide in said housing means for dissipating heat generated by the ultra violet light focussed onto said light guide by said silica rod means.

2. A light guide coupling apparatus according to claim 1 wherein said tubular means is made of a low heat coefficient and opaque material.

3. A light guide coupling apparatus according to claim 2 wherein said silica rod means is a fused silica rod having a length substantially identical to the length of said tubular means.

4. A light guide coupling apparatus according to claim 3 wherein said silica rod means is a quartz rod.

5. A light guide coupling apparatus according to claim 4 wherein said housing means includes a bottom panel having a plurality of ventilation openings formed therein.

6. A light guide coupling apparatus according to claim 5 wherein said housing means includes a top panel having a blower means mounted thereon and operative to draw fresh air to flow through said housing means to dissipate heat generated in said housing means by said ultra violet light focussed onto said light guide by said silica rod means.

* * * * *